United States Patent

[11] 3,593,100

| [72] | Inventors | George William Foster<br>Manchester, England; |
|---|---|---|
| [21] | Appl. No. | 863,074 |
| [22] | Filed | Oct. 2, 1969 |
| [45] | Patented | July 13, 1971 |
| [73] | Assignee | Electric Power Storage Limited,<br>Manchester, England |

[54] APPARATUS FOR CONTROLLING A PULSATING BATTERY CHARGER
8 Claims, 3 Drawing Figs.

[52] U.S. Cl. ................................ 320/22,
320/31, 320/39
[51] Int. Cl. .................................... H02j 7/10
[50] Field of Search ........................ 320/21–
—24, 37, 40, 31, 43

[56] References Cited
UNITED STATES PATENTS

| 3,356,922 | 12/1967 | Johnston | 320/40 X |
| 2,885,623 | 5/1959 | Staufenberg, Jr. | 320/TD |
| 3,160,805 | 12/1964 | Lawson, Jr. | 320/TD |
| 3,176,210 | 3/1965 | Bethke | 320/TD |
| 3,247,441 | 4/1966 | Kimbleton | 320/TD |
| 3,348,118 | 10/1967 | Watrous | 320/SCR |
| 3,363,162 | 1/1968 | Bawden | 320/TD |
| 3,392,317 | 7/1968 | Eberts et al. | 320/TD |
| 3,447,059 | 5/1969 | Ford et al. | 320/TD |
| 3,487,284 | 12/1969 | Cady | 320/40 |

FOREIGN PATENTS

| 1,059,331 | 2/1967 | Great Britain | 320/39 |

Primary Examiner—J. D. Miller
Assistant Examiner—John M. Gunther
Attorney—Watson, Cole, Grindle & Watson ABSTRACT: An automatic battery charging circuit employing rectified alternating current includes a capacitor which is connected across the battery by a switching transistor only during the intervals between the pulses of charging current, and a level responsive transistor or trigger circuit, which responds when the voltage across the capacitor exceeds a predetermined value, and then cuts off or reduces the charging current. Thus the duration of the charge (or a phase of it) is determined by the battery voltage during the intervals between pulses of charging current, and is less dependent on battery resistance and temperature than conventional systems.

INVENTOR
GEORGE WILLIAM FOSTER
BY
Watson, Cole, Grindle & Watson
ATTORNEY 3,593,100

APPARATUS FOR CONTROLLING A PULSATING BATTERY CHARGER

The present invention relates to battery charging apparatus and is concerned with means for automatically terminating or modifying the charge.

According to the present invention charging apparatus for charging a battery from a pulsating supply includes means for automatically terminating or modifying the charge in response to the voltage of the battery during the intervals between pulses of charging current.

With conventional AC input constant-voltage chargers having control circuits directly connected to the battery, the input and consequently the charging times can vary very widely with the resistance of the battery, since this naturally has a considerable effect on the voltage developed across the battery during each pulse of charging current. This difficulty arises particularly in connection with low-maintenance, sealed or semisealed lead acid batteries which operate with a minimum of electrolyte and may have an internal resistance several times higher than that of a standard battery. Moreover these resistances are dependent upon temperature and can vary appreciably from battery to battery according to the state of dampness of the elements or the degree of sulphation of the plates. Thus an object of the present invention is to provide a form of charging apparatus in which a change in the resistance of the cell will have little or no effect on the control of the charging current. In particular, since cell resistance is the parameter most affected by temperature, this invention will provide a charger whose output is much less affected by variations in battery temperature. Charging at low temperature becomes practical and the need for accurate built-in temperature compensation for chargers designed to operate over a wide range of temperature may be eliminated. Any tendency for temperature runaway should be greatly reduced.

In the case of half-wave rectification the charging current of course ceases during alternative half-cycles, but even in the case of full-wave rectification from a single phase supply with no smoothing, there are appreciable intervals between the moment when the instantaneous supply voltage falls below the battery voltage and the moment when it rises above it again. During these intervals the voltage of the battery is due to residual polarization following the charging pulse, and it has been found that this gives a reliable indication of the state of charge and is but little affected by the resistance of the battery.

The charging circuit may be arranged in various ways. Thus it may include a circuit connected across the battery terminals and including a capacitor and a switch arranged to conduct during the intervals between pulses of charging current. The switch conveniently comprises a transistor having its base emitter circuit shunted across an impedance connected in series in the charging circuit. Such impedance may include a transistor which itself serves to terminate the charge. Alternatively or in addition where half-wave rectification is employed the said impedance may include a diode serving to provide the half-wave rectification.

The circuit may include a level-responsive trigger circuit responsive to the capacitor voltage to terminate the charge.

In addition the circuit may include a current control device. Conveniently a single transistor serves both to control the current and to terminate the charge. Thus in one arrangement a transistor is connected in the charging circuit in series with a resistor, and the current control device serves to compare the drop of voltage across the resistor with that of a Zener diode and to control the transistor accordingly.

The invention may be put into practice in various ways but certain specific embodiments will be briefly described by way of example with reference to the accompanying drawings in which.

Figure 1:
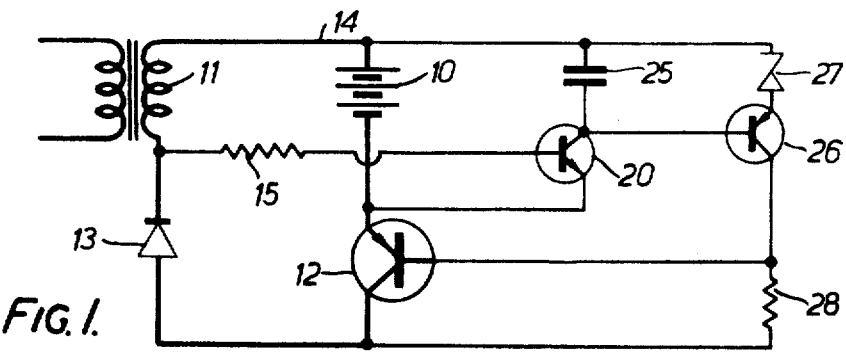
FIG. 1 is a circuit diagram showing a simple basic circuit employing half-wave rectification.

In the arrangement shown in FIG. 1 the battery 10 is connected in series with the secondary winding 11 of a transformer connected to an alternating current supply and with a transistor 12 and half-wave rectifying diode 13. A switching transistor 20 has its emitter connected to the negative terminal of the battery and its base connected through a resistor 15 to the negative terminal of the diode 13 so that its emitter-base circuit is connected across the secondary winding 11 and the batter 10, so as to be subject to the difference between their instantaneous values of voltage. Thus so long as the instantaneous voltage of the secondary winding exceeds that of the battery, that is to say so long as a charging current pulse persists, the transistor 20 will be switched off.

A capacitor 25 is connected between the collector of the switching transistor 20 and the positive battery terminal 14. Thus during the intervals between pulses of charging current, the switching transistor 20 will connect the capacitor 25 in parallel with the battery 10 and the capacitor will be charged to a corresponding voltage which it will retain during the periods in which charging current pulses flow. A level-responsive transistor 26 has its base connected to the negative terminal of the capacitor and its emitter connected through a Zener diode 27 to its positive terminal, while its collector is connected to the base of the transistor 12 and through a resistor 28 to the collector of the latter.

Thus as the charge continues the voltage across the capacitor 25 gradually builds up until it exceeds that of the Zener diode 27, whereupon the transistor 26 conducts, applying a positive voltage to the base of the transistor 12 and reducing its emitter-base current, thereby reducing the charging current.

Figure 2:
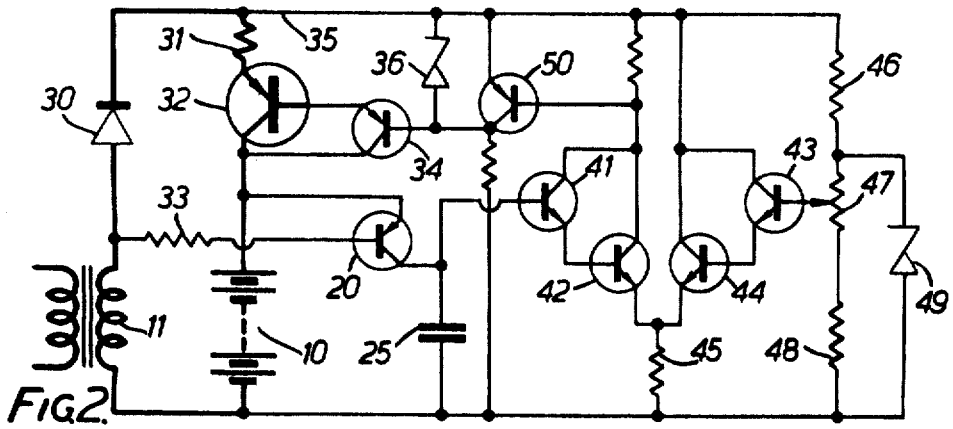
FIG. 2 is a circuit diagram showing half-wave rectification and incorporating a level-responsive trigger circuit and a current control device.

FIG. 2 shows a further arrangement employing half-wave rectification but incorporating a level responsive trigger circuit and a current control device. Here the battery 10 is connected in series with a secondary winding 11 of a supply transformer, a diode 30, a resistor 31 and a transistor 32 in that order. The transistor 32 has its base and collector connected respectively to the emitter and collector of a transistor 34 having its base connected through a Zener diode 36 to the junction 35 between the diode 30 and resistor 31. This provides a current control device comparing the voltage drop across the resistor 31 with the voltage across the Zener diode 36 and causing the transistors 34 and 32 to control the charging current accordingly.

A switching transistor 20 performs the same function as the correspondingly numbered transistor in FIG. 1, namely to control the charging of a capacitor 25. In this case it is slightly differently connected but again its emitter-base circuit including a base resistor 33, is connected across the battery in series with the secondary winding of the transformer, while the negative terminal of the capacitor 25 is connected to the negative terminal of the battery.

The capacitor 25 is connected to a level-responsive trigger circuit comprising two pairs of transistors 41, 42, 43 and 44. Each pair is connected in cascade and the two pairs share a common emitter resistor 45 giving the well known trigger effect whereby one pair of transistors can conduct while the other is cut off, and when a changeover starts to occur the action is cumulative since the change of current in one pair flowing through the resistor 45 affects the other pair so as to give a rapid changeover.

The capacitor voltage from the capacitor 25 is applied to the base of the transistor 41 of one pair and a constant voltage derived from a potential divider, comprising resistors 46, 47 and 48, of which the latter two are shunted by a Zener diode 49, is applied to the base of the transistor 43 of the other pair. The latter voltage can be adjusted by employing a potentiometer as the resistor 47. The collector of the pair of transistors 41 and 42 is connected to the base of a transistor 50 whose collector is connected to the base of the transistor 34 controlling the transistor 32, so that when the voltage of the capacitor 25 rises above a given value, depending upon the Zener diode 49, and the transistors 41 and 42 conduct they cause the transistor 50 to conduct and this reduces the emitter-base current of the transistors 34 and 32 which causes the charge current to reduce.

Figure 3:
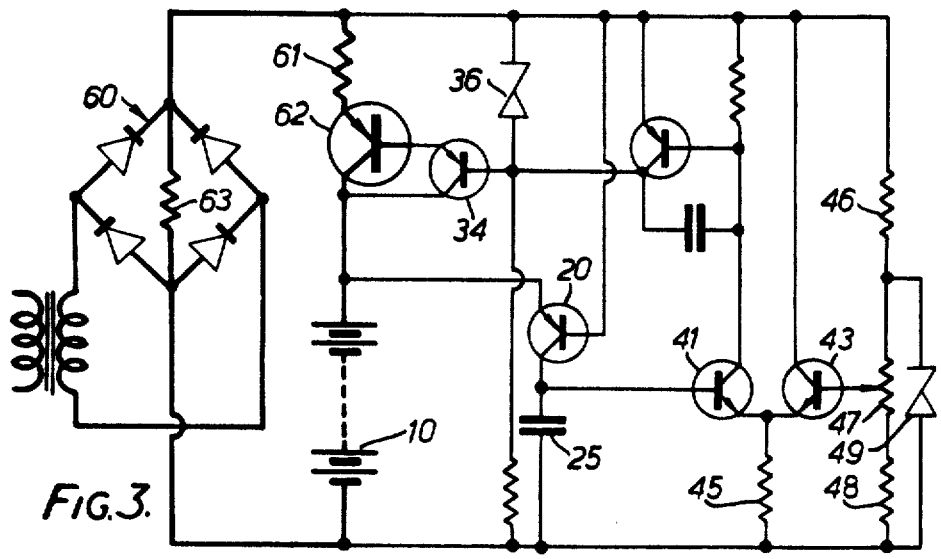
FIG. 3 is a circuit diagram similar to FIG. 2 except that it employs full-wave rectification.

The arrangement of FIG. 3 is generally similar to that of FIG. 2 except that it employs full-wave rectification. Thus the battery 10 is connected to the output of a bridge rectifier 60 through a resistor 61 and a main transistor 62 in that order. The remaining parts of the circuit are very similar to those of FIG. 2 and bear the same reference numerals. The switching transistor 20 has its emitter-base circuit connected across the battery in series with the bridge rectifier 60, its emitter being connected directly to the positive battery terminal and its base is connected to the positive terminal of the bridge rectifier. The necessary emitter-base current is provided by resistor 63. In FIG. 3 the trigger circuit is shown with only two transistors 41 and 43.

The operation is the same as that of FIG. 2 and is understood by those skilled in the art, thereby obviating the need to describe it in detail.

I claim:

1. Apparatus for charging a battery from a pulsating supply having terminals for connection to the battery, comprising;
    a charge control device connected between the supply terminals and said battery terminals for terminating the charging of said battery,
    a capacitor for sensing the voltage of said battery only during the intervals of said pulsating supply not charging said battery and for controlling said charge control device,
    and switching means driven by said pulsating supply and conducting only during the intervals between pulses of said supply charging said battery to charge said capacitor.

2. Charging apparatus as claimed in claim 1 in which said charge control device includes an impedance, said switching means comprises a transistor having its base-emitter circuit shunted across said impedance.

3. Charging apparatus as claimed in claim 2 in which said impedance includes a transistor which serves to terminate the charging of said battery.

4. Charging apparatus as claimed in claim 2 in which the charging current is half-wave and said impedance further includes a diode serving to provide half-wave rectification of the output of said pulsating supply.

5. Charging apparatus as claimed in claim 1 in which said charge control device includes a level responsive trigger circuit responsive to the capacitor voltage to terminate the charging of the battery.

6. Charging apparatus as claimed in claim 1 in which said charge control device includes a current control device for reducing the charging current to said battery.

7. Charging apparatus as claimed in claim 6 in which said current control device is a single transistor to control the current and to terminate the charging of the battery.

8. Charging apparatus as claimed in claim 7 in which said current control device includes a resistor connected in series with said transistor and a Zener diode, and said current control device series to compare the drop of voltage across the resistor with that of said Zener diode and to control said transistor accordingly.